United States Patent
Jasper et al.

(10) Patent No.: US 11,566,528 B2
(45) Date of Patent: Jan. 31, 2023

(54) ROTOR BLADE SEALING STRUCTURES

(71) Applicant: General Electric Company, Schenectady, NY (US)

(72) Inventors: Martin James Jasper, Simpsonville, SC (US); Claire Katherine Naioti, Greenville, SC (US); Melbourne James Myers, Duncan, SC (US); William Scott Zemitis, Simpsonville, SC (US); Stephen Douglas Shearer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/722,020

(22) Filed: Dec. 20, 2019

(65) Prior Publication Data

US 2021/0189887 A1    Jun. 24, 2021

(51) Int. Cl.
*F01D 11/00*    (2006.01)
*F01D 5/22*    (2006.01)
*F01D 5/02*    (2006.01)

(52) U.S. Cl.
CPC ............. *F01D 5/22* (2013.01); *F01D 5/025* (2013.01); *F01D 11/006* (2013.01); *F01D 11/008* (2013.01); *F05D 2220/32* (2013.01)

(58) Field of Classification Search
CPC .... F01D 11/006; F01D 11/008; F01D 11/005; F01D 5/22; F01D 5/3007
See application file for complete search history.

(56) References Cited

U.S. PATENT DOCUMENTS

| | | | | |
|---|---|---|---|---|
| 5,513,955 A | * | 5/1996 | Barcza | F01D 5/22 416/193 A |
| 5,573,375 A | * | 11/1996 | Barcza | F01D 5/22 416/193 A |
| 6,086,329 A | * | 7/2000 | Tomita | F01D 11/006 277/634 |

(Continued)

FOREIGN PATENT DOCUMENTS

EP    2843197 A2    3/2015

OTHER PUBLICATIONS

European Search Report Corresponding to Applicant No. 20211988 dated Apr. 9, 2021.

*Primary Examiner* — Richard A Edgar
*Assistant Examiner* — Behnoush Haghighian
(74) *Attorney, Agent, or Firm* — Dority & Manning, P.A.

(57) ABSTRACT

A rotor blade is provided. The rotor blade includes a main body having a shank, an airfoil extends radially outwardly from the shank, and a platform. The main body includes a pressure side slash face and a suction side slash face. A slot is defined within each of the pressure side slash face and the suction side slash face. The slot of the pressure side slash face and the slot of the suction side slash face each include an upstream end portion that defines an end and a main body portion extending from the upstream end portion. The upstream end portion tapers from the end to the main body portion. The main body portion further includes a retention wall that covers a portion of the end and that defines an opening. The retention wall further includes an inner retention surface. The retention wall defines an offset from the opening.

18 Claims, 8 Drawing Sheets

(56) References Cited

U.S. PATENT DOCUMENTS

| | | | |
|---|---|---|---|
| 6,561,764 B1* | 5/2003 | Tiemann | F01D 5/3015 |
| | | | 416/193 A |
| 6,565,322 B1* | 5/2003 | Lieser | F01D 11/006 |
| | | | 416/219 R |
| 7,575,415 B2* | 8/2009 | Drerup | F01D 11/005 |
| | | | 29/888.3 |
| 9,797,270 B2* | 10/2017 | O'Leary | F01D 5/22 |
| 9,810,075 B2* | 11/2017 | Lana | F01D 11/008 |
| 9,816,393 B2 | 11/2017 | Simon-Delgado et al. | |
| 9,822,658 B2* | 11/2017 | Lewis | F01D 11/08 |
| 9,845,690 B1* | 12/2017 | Giametta | F01D 9/023 |
| 9,909,439 B2* | 3/2018 | Bluck | F01D 5/147 |
| 10,113,434 B2* | 10/2018 | Snyder | F01D 11/006 |
| 10,323,531 B2* | 6/2019 | Bluck | F01D 5/3007 |
| 10,907,491 B2* | 2/2021 | Tyagi | F01D 11/008 |
| 2007/0104571 A1* | 5/2007 | Drerup | F01D 11/005 |
| | | | 415/191 |
| 2008/0181779 A1 | 7/2008 | Decardenas | |
| 2013/0195665 A1* | 8/2013 | Snyder | F01D 11/006 |
| | | | 416/174 |
| 2015/0075180 A1* | 3/2015 | Zhang | F01D 11/006 |
| | | | 60/806 |
| 2015/0125301 A1* | 5/2015 | Headland | F01D 11/006 |
| | | | 416/174 |
| 2016/0273367 A1* | 9/2016 | Lana | F01D 5/3007 |
| 2016/0298480 A1* | 10/2016 | Bluck | F01D 11/008 |
| 2020/0200032 A1* | 6/2020 | Laroche | F01D 11/005 |

* cited by examiner

ROTOR BLADE SEALING STRUCTURES

FIELD

The present disclosure relates generally to rotor blades for turbomachines and, more particularly, to improved rotor blade sealing structures.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The compressor section and the turbine section generally include a plurality of rotor blades, typically arranged in a plurality of stages. During engine operation, fluctuations in the flow of working fluid being compressed or the hot combustion gases or steam may cause leaks within the rotor blade assembly, which result in an overall loss in engine performance. For example, hot combustion gases from the turbine section may leak into the blade shank or root cavity causing unwanted rotor disk heating.

In order to improve overall engine performance by minimizing leaks in the rotor blades, seals are typically provided between rotor blades on the rotor disk to prevent escaped working fluid or combustion gases from passing therethrough.

However, there is a desire to improve the overall seal effectiveness. For example, one issue with many known rotor blade seals is that they are cumbersome to install and require additional hardware, such as a locking plate or plates, to maintain retention within the rotor blade shank. Failure of the additional hardware may cause the seal to back out of its slot and/or prematurely fail.

Accordingly, improved rotor blade seal retention designs are desired in the art. In particular, damper designs that provide improved seal retention without requiring additional hardware would be advantageous.

BRIEF DESCRIPTION

Aspects and advantages of the rotor blades, rotor blade assemblies, and turbomachines in accordance with the present disclosure will be set forth in part in the following description, or may be obvious from the description, or may be learned through practice of the technology.

In accordance with one embodiment, a rotor blade assembly for a turbomachine is provided. The rotor blade assembly includes a rotor disk and a first rotor blade and a second rotor blade mounted on the rotor disk, adjacent to one another. The first rotor blade and the second rotor blade each include a main body having a shank, an airfoil extending radially outwardly from the shank, and a platform. The main body includes a pressure side slash face and a suction side slash face. A slot is defined within each of the pressure side slash face and the suction side slash face. The slot of the pressure side slash face and the slot of the suction side slash face each include an upstream end portion that defines an end and a main body portion that extends from the upstream end portion. The upstream end portion tapers from the end to the main body portion. The main body further includes a retention wall that covers a portion of the end and defines an opening. The retention wall further includes an inner retention surface. The retention wall defines an offset from the opening. The slot of the pressure side slash face of the first rotor blade and the slot of the suction side slash face of the second rotor blade define a channel.

In accordance with another embodiment, a rotor blade is provided. The rotor blade includes a main body having a shank, an airfoil extending radially outwardly from the shank, and a platform. The main body includes a pressure side slash face and a suction side slash face. A slot is defined within each of the pressure side slash face and the suction side slash face. The slot of the pressure side slash face and the slot of the suction side slash face each include an upstream end portion that defines an end and a main body portion that extends from the upstream end portion. The upstream end portion tapers from the end to the main body portion. The main body further includes a retention wall that covers a portion of the end and defines an opening. The retention wall further includes an inner retention surface. The retention wall defines an offset from the opening.

In accordance with another embodiment, a turbomachine is provided. The turbomachine includes a compressor section, a combustor section, and a turbine section. The turbomachine further includes a plurality of rotor blades provided in at least one of the compressor section or the turbine section. Each of the plurality of rotor blades includes a main body having a shank, an airfoil extending radially outwardly from the shank, and a platform. The main body includes a pressure side slash face and a suction side slash face. A slot is defined within each of the pressure side slash face and the suction side slash face. The slot of the pressure side slash face and the slot of the suction side slash face each include an upstream end portion that defines an end and a main body portion extending from the upstream end portion. The upstream end portion tapers from the end to the main body portion. The main body further includes a retention wall that covers a portion of the end and defines an opening. The retention wall further includes an inner retention surface. The retention wall defines an offset from the opening.

These and other features, aspects and advantages of the present rotor blades, rotor blade assemblies, and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor blades, rotor blade assemblies, and turbomachines, including the best mode of making and using the present systems and methods, directed to one of ordinary skill in the art, is set forth in the specification, which makes reference to the appended figures, in which.

DETAILED DESCRIPTION

Figure 1:
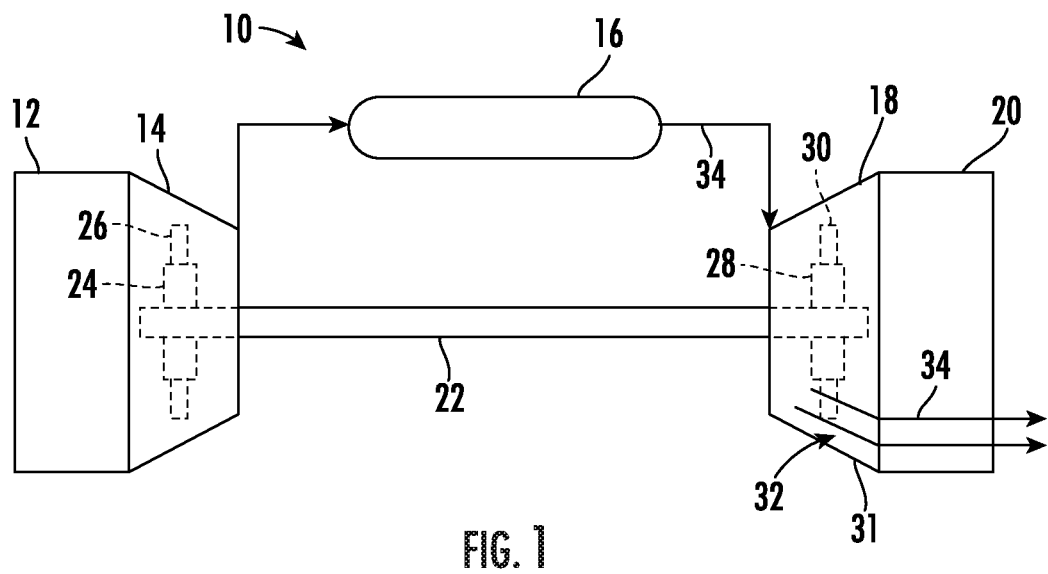
FIG. 1 illustrates a schematic diagram of a turbomachine, in accordance with embodiments of the present disclosure.

Reference now will be made in detail to embodiments of the present rotor blades, rotor blade assemblies, and turbomachines, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "generally," or "about," include values within ten percent greater or less than the stated value. When used in the context of an angle or direction, such terms include within five degrees greater or less than the stated angle or direction. For example, "generally vertical" includes directions within five degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or a land-based gas turbine, unless otherwise specified in the claims. For example, the rotor blades and rotor blade assemblies as described herein may be used in any type of turbomachine, including, but not limited to a steam turbine, an aircraft gas turbine or a marine gas turbine.

As shown, the gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, where energy (kinetic and/or thermal) is transferred from the combustion gases 34 to the rotor blades 30, thus causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
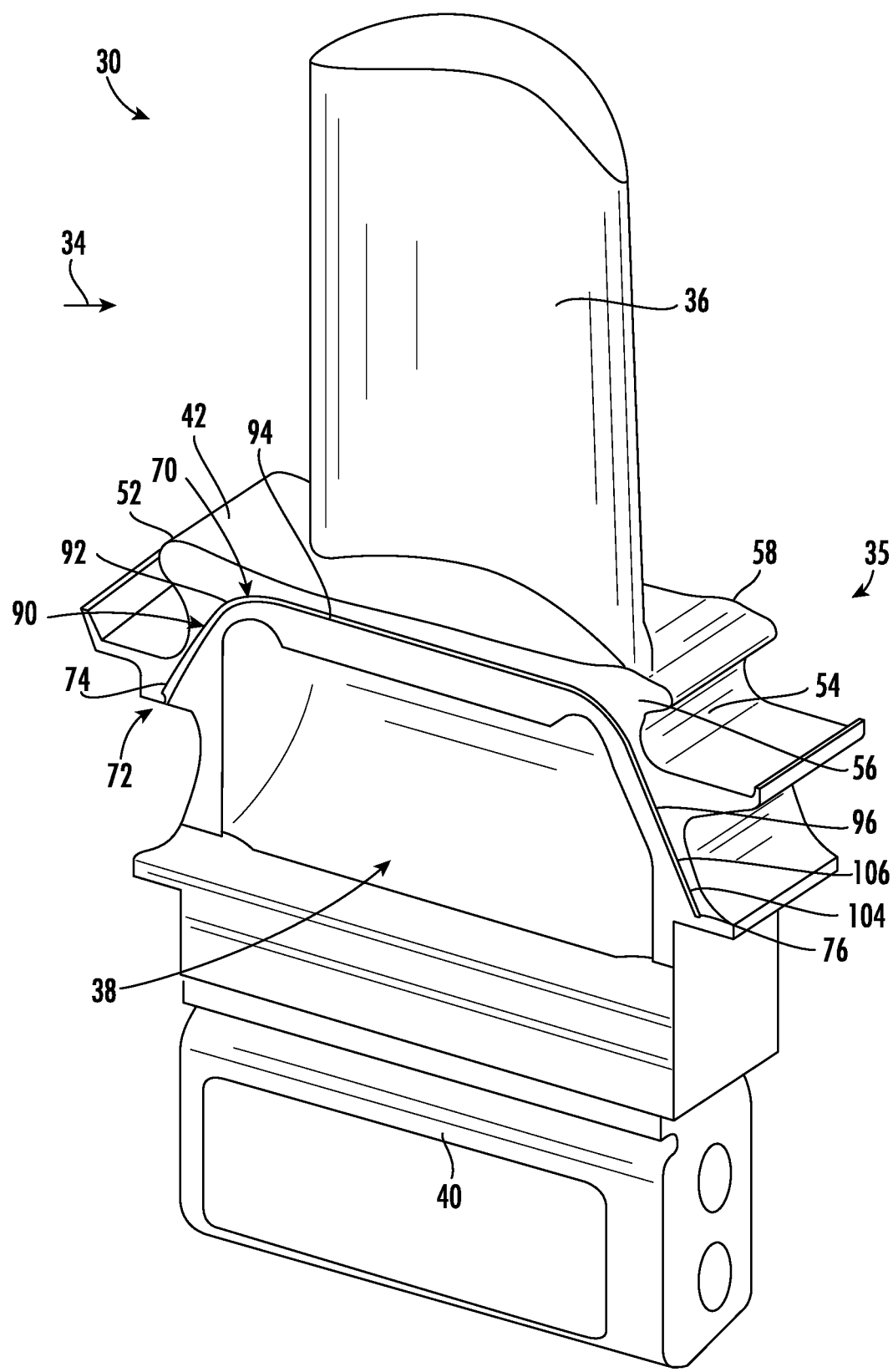
FIG. 2 illustrates a perspective pressure-side view of a rotor blade, in accordance with embodiments of the present disclosure.
Figure 3:
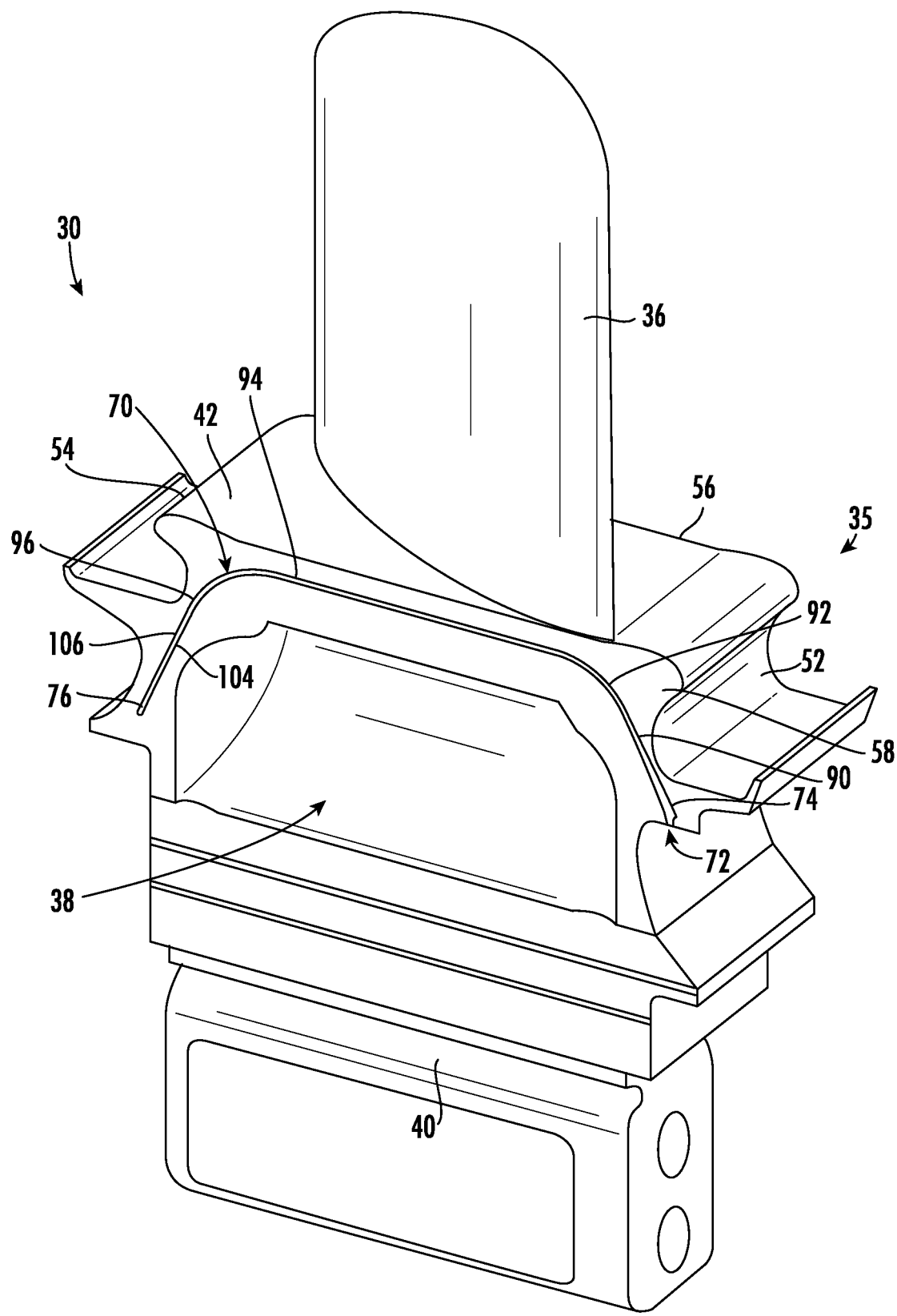
FIG. 3 illustrates a perspective suction-side view of a rotor blade, in accordance with embodiments of the present disclosure.

FIGS. 2 and 3 illustrates an embodiment of a rotor blade in accordance with embodiments of the present disclosure. In the embodiment shown, the rotor blade is a turbine blade or bucket 30, although, in alternative embodiments, the rotor blade could be a compressor blade or bucket 26.

The rotor blade 30 may include a main body 35, which includes an airfoil 36 and a shank 38. The airfoil 36 may extend and be positioned radially outwardly from the shank 38. The shank 38 may include a root or dovetail 40, which may attach to the rotor disk 28 to facilitate rotation of the rotor blade 30.

The airfoil 36 may have a generally aerodynamic contour. For example, the airfoil 36 may have an exterior surface defining a pressure side and suction side each extending between a leading edge and a trailing edge. The exterior surface of the shank 38 may include a pressure side face, a suction side face, a leading edge face, and a trailing edge face.

The main body 35 may further include a platform 42 that generally surrounds the main body 35. A typical platform may be positioned at an intersection or transition between the airfoil 36 and the shank 38 and may extend outwardly in the generally axial and tangential directions, as shown. In the turbine section 18, the platform 42 generally serves as a radially inward flow boundary for the combustion gases 34 flowing through the hot gas path 32. The platform 42 may include a leading edge face 52 axially spaced apart from a trailing edge face 54. The leading edge face 52 is positioned into the flow of combustion gases 34, and the trailing edge face 54 is positioned downstream from the leading edge face 52. Furthermore, the platform 42 may include a pressure-side slash face 56 circumferentially spaced apart from a suction-side slash face 58.

In some embodiments, as illustrated in FIGS. 2 and 3, the pressure-side slash face 56 and/or suction-side slash face 58 may be generally planar faces (which may be conventionally planar or skewed). In other embodiments, the pressure-side slash face 56 and/or suction-side slash face 58 or at least portions thereof may be curviplanar. For example, in the embodiment shown in FIG. 4, the pressure-side slash face 56 or suction-side slash face 58 may be curved relative to the axial direction, radial direction, and/or tangential direction.

Figure 6:
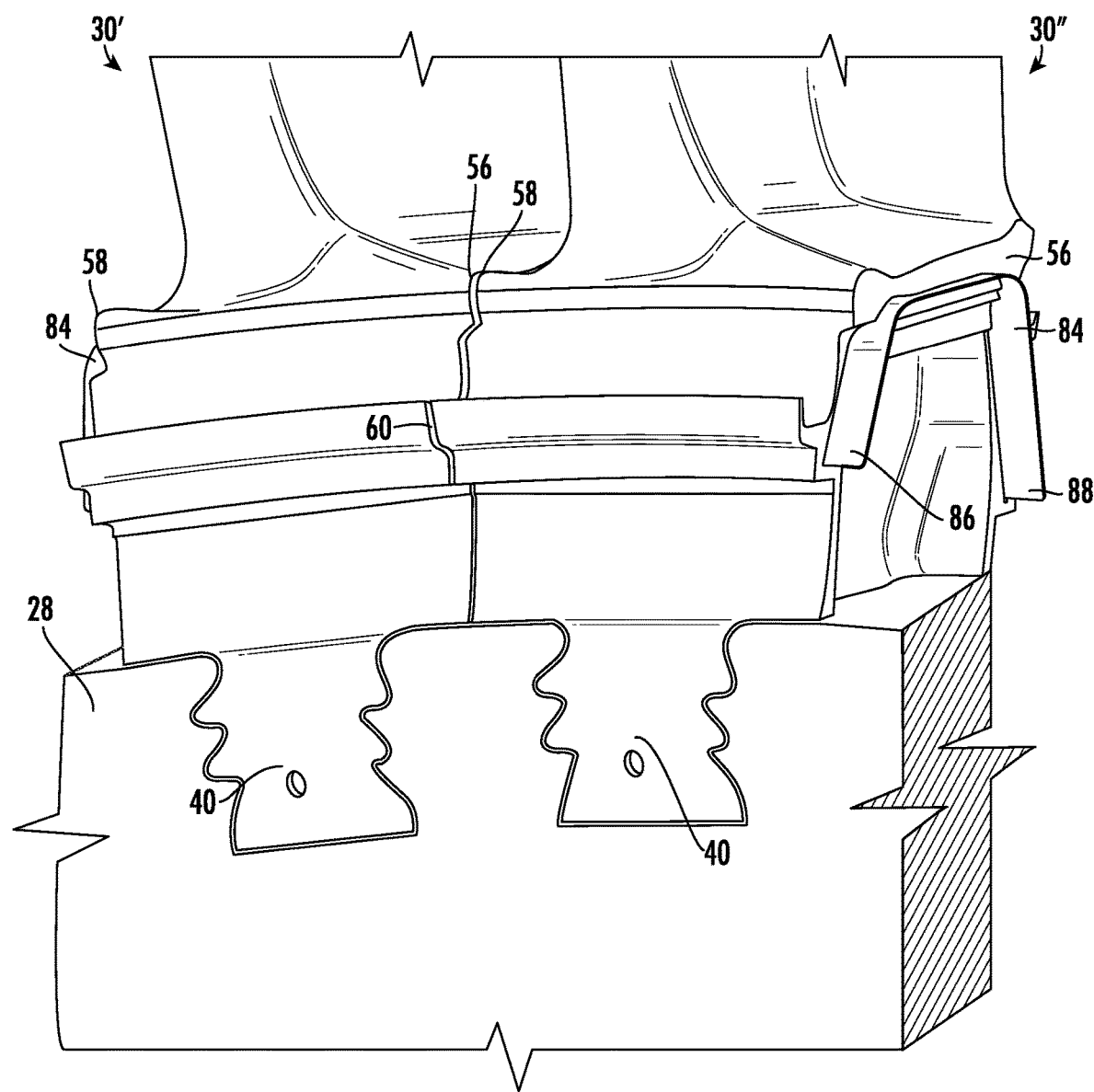
FIG. 6 is a side view of a rotor blade assembly having two neighboring rotor blades, in accordance with embodiments of the present disclosure.

FIG. 6 illustrates a perspective view of a pair of circumferentially adjacent, neighboring rotor blades 30', 30" in a rotor blade assembly 200. As shown, the pressure-side slash face 56 of a rotor blade 30 faces the suction-side slash face 58 of a neighboring rotor blade 30 when the rotor blades 30 are so positioned. As discussed above, a plurality of rotor blades 30 may be provided on each of one or more rotor disks 28 and may extend radially outwardly therefrom. The rotor blades 30 provided on a rotor disk 28 may be assembled in a circumferential array, such that the pressure-side slash face 56 of each rotor blade 30 faces the suction-side slash face 58 of each neighboring rotor blade 30 when the rotor blades 30 are so assembled. In some embodiments, the pressure-side slash face 56 of each rotor blade 30 and the suction-side slash face 58 of each neighboring rotor blade 30 may define a gap 60.

Referring again to FIGS. 2 and 3, the pressure-side slash face 56 and the suction side slash face 58 of the main body 35 are shown. The main body 35 may include one or more slots 70. A slot 70 may be defined within the pressure-side slash face 56 and/or within the suction-side slash face 58 of the main body 35. The slot 70 may include an upstream end portion 74 that defines a slot end or end 72. Slot 70 may extend from the slot end 72 to a closed downstream end 76. Slot 70 may be one continuous groove defined along the pressure-side slash face 56 and/or the suction-side slash face 58. In some embodiments, the slot 70 may be defined circumferentially into each of the pressure-side slash face 56 and the suction-side slash face 58 of the main body 35.

The slot 70 includes a main body portion 90 that extends directly from the upstream end portion 74 to the closed downstream end 76. In some embodiments, the main body portion 90 of slot 70 may be continuous with the upstream end portion 74. The main body portion 90 of slot 70 may include a leading edge segment 92, a platform segment 94, and a trailing edge segment 96. The leading edge segment 92 may be defined along the leading edge face 52, the platform segment 94 may be defined along the platform 42, and the trailing edge segment 96 may be defined along the trailing edge face 56. As used herein, terms such as "defined along" and cognates thereof may mean "substantially parallel to" or "generally aligned with." In other embodiments, the leading edge segment 92 and the trailing edge segment 96 of slot 70 may be oriented generally radially with respect to the axial centerline of gas turbine 10. Likewise, the platform segment 92 of the slot 70 may be oriented generally axially.

In some embodiments, the leading edge segment 92 may be directly connected to and continuous with the platform segment 94. Likewise, the platform segment 94 may be directly connected to and continuous with the trailing edge segment 96. Slot 70 may taper from the end 72 to the main body portion 90. More specifically, the slot 70 may taper from the end 72 to the leading edge segment 92 of the main body portion 90.

Figure 4:
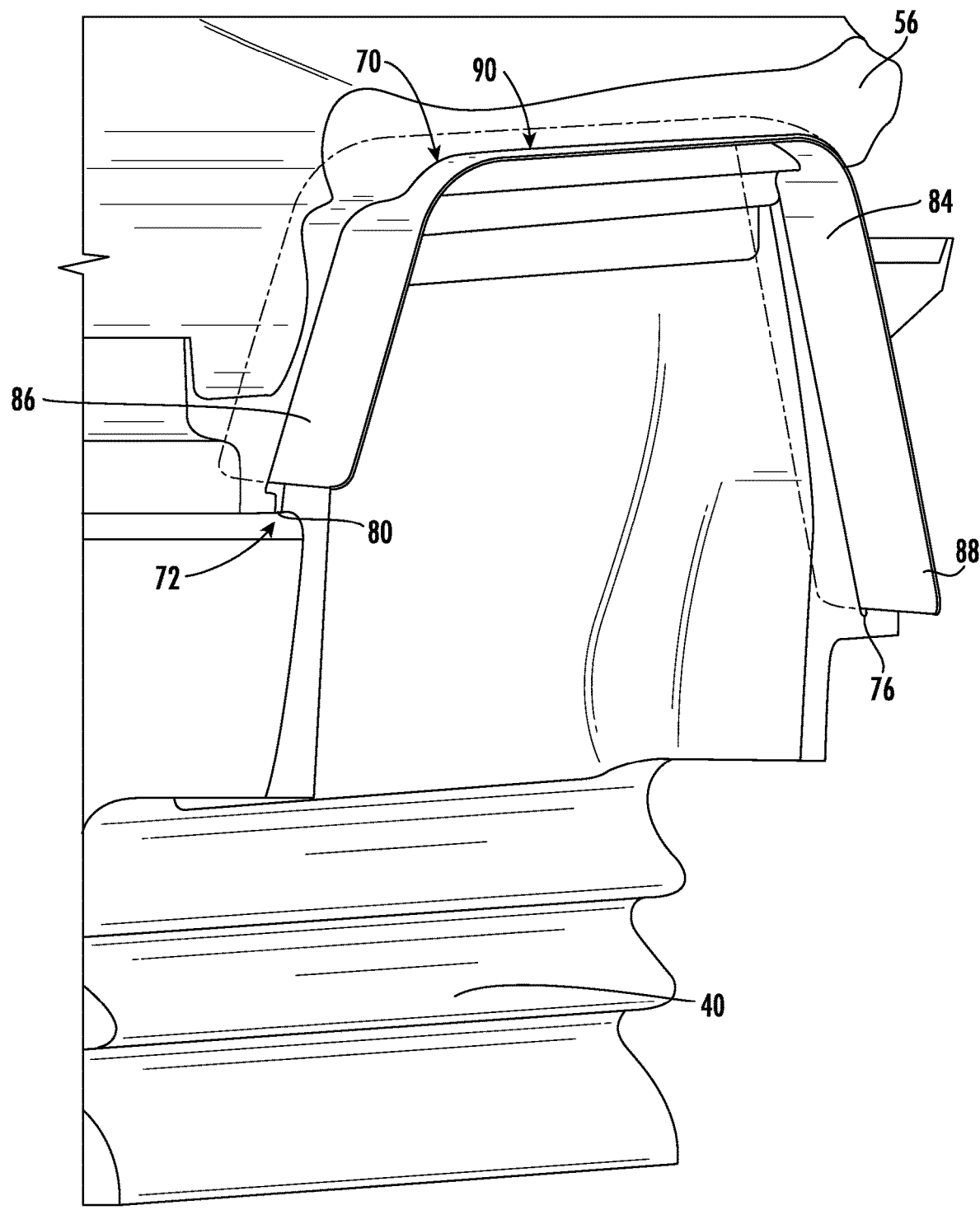
FIG. 4 is an enlarged perspective view of a pressure-side slash face of a rotor blade with a seal provided in a slot thereof, in accordance with embodiments of the present disclosure.

As shown in FIG. 4, the main body portion 90 of the slot 70 may be sized to securely contain a portion of the seal 84 therein, i.e., the main body portion 90 may be sized to prevent the seal 84 from sliding out of the slot 70 during operation of the gas turbine 10. Seal 84 may further include a first end 86 and a second end 88 and may extend therebetween. Seal 84 may be sized to sealingly fit at least partially into the slot 70.

In various embodiments, the slot 70 may include one or more broken walls (not shown) along its length, e.g. the leading edge segment 92, the platform segment 94, and the trailing edge segment 96. In such embodiments, one or more of the slot walls may be recessed, thereby at least partially exposing a larger portion of the seal 84 therein. Accordingly, the slot 70 may, in some embodiments, be discontinuous from the upstream end portion 74 to the closed downstream end 76.

Figure 5:
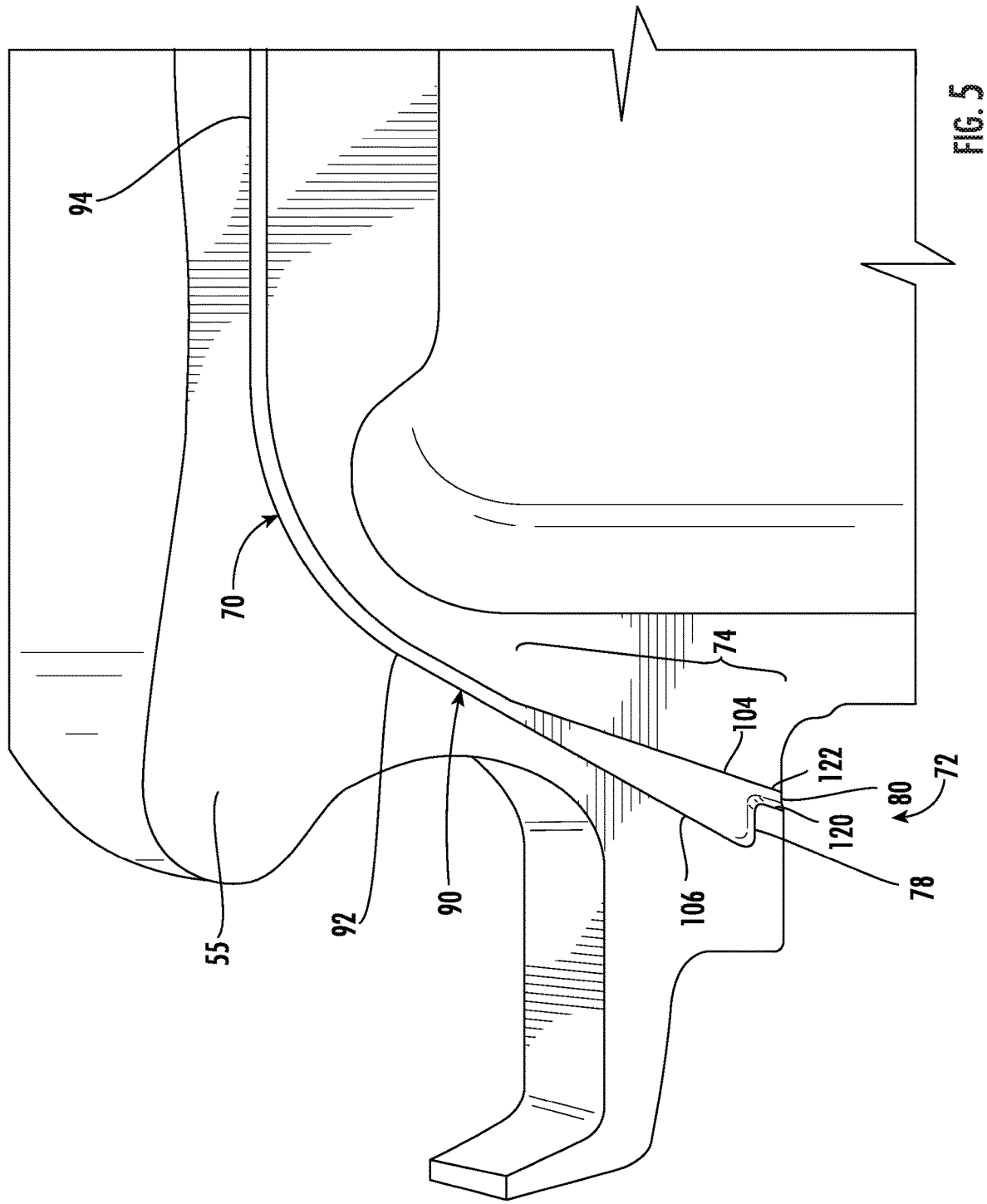
FIG. 5 is an enlarged side view of a slash face of a rotor blade, in accordance with embodiments of the present disclosure.

Referring now to FIG. 5, an enlarged side view of a portion of a slash face 55 showing the slot 70 is illustrated. Slash face 55 may be the pressure-side slash face 56 or the suction-side slash face 58. As shown in FIG. 5, the end 72 of slot 70 may further include a retention wall 78 that covers a portion of end 72 and defines a slot opening 80. In many embodiments, the slot opening 80 functions to slidably receive at least a portion of the seal 84 into the slot 70 (as shown in FIG. 4). As shown in FIG. 5, the slot 70 may further include a first slot wall 104 and a second slot wall 106 separated from each other. In some embodiments, the retention wall 78 may extend outwardly from the second slot wall 106 and define a first opening portion 120 of the opening 80 at the end 72. Additionally, the first slot wall 104 may extend from the closed downstream end 76 to the end 72 and partially define a second opening portion 122 of the opening 80 at the end 72. The first slot wall 104 may be directly connected to and continuous with the second opening portion 122.

Figure 7:
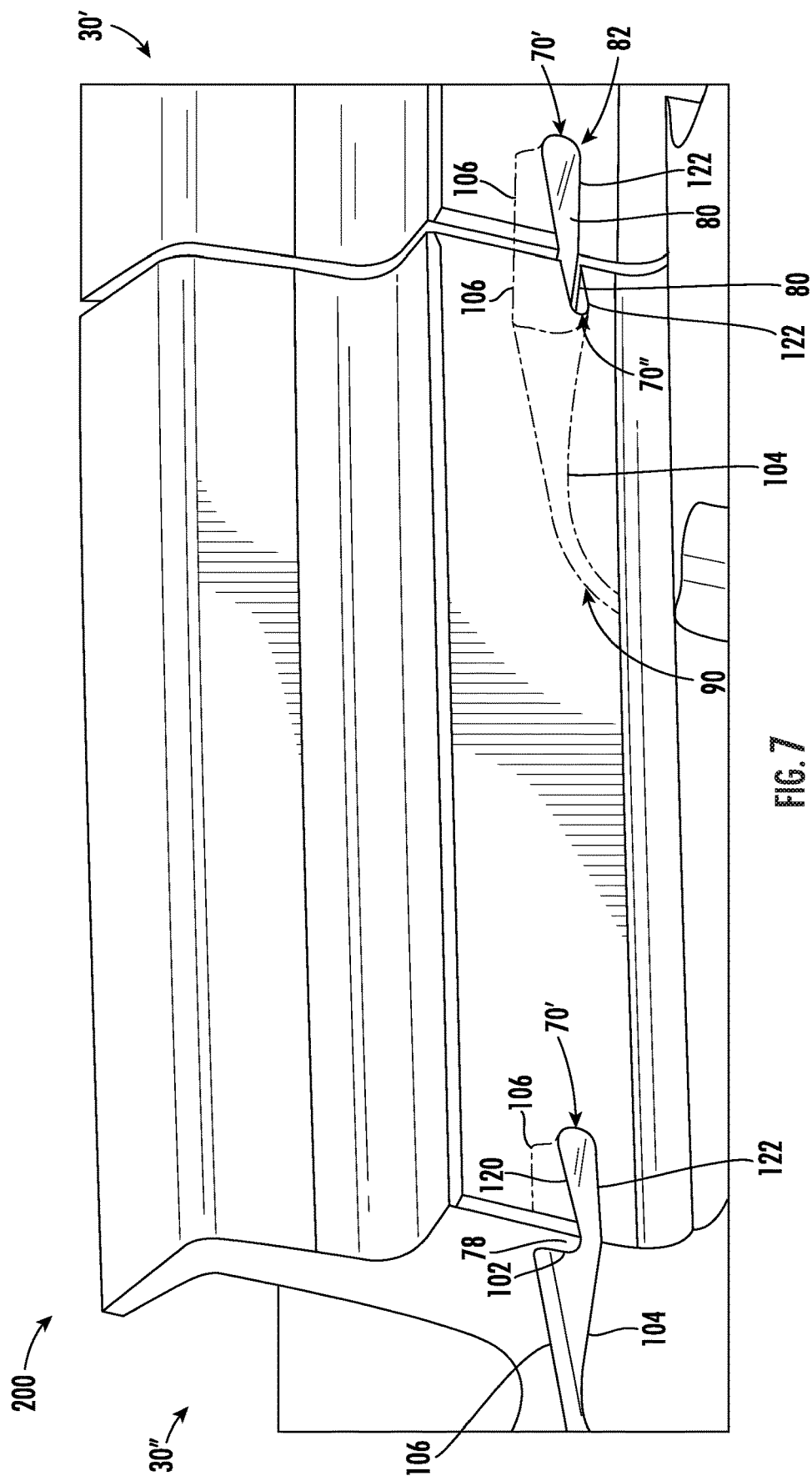
FIG. 7 is an enlarged bottom view of the rotor blade assembly with neighboring rotor blades, in accordance with embodiments of the present disclosure.

In some embodiments, as shown in FIG. 7, the first slot wall 104 may extend past an inner retention surface 102 of retention wall 78. The second slot wall 106 may extend from the closed downstream end 76 to the inner retention surface 102. In some embodiments, the first opening portion 120 and the second opening portion 122 may be parallel to each other in the circumferential direction at the end 72.

In some embodiments, such as the ones shown in FIGS. 2-5, the first slot wall 104 and the second slot wall 106 may be substantially parallel to one another along the main body portion 90 of the slot 70. Additionally, the first slot wall 104 and the second slot wall 106 may taper away from one another along the upstream end portion 74. In some embodiments, the first slot wall 104 and the second slot wall 106 may both taper away from each other from the main body portion 90 to the inner retention surface 102 of the retention wall 78.

As shown in FIG. 5, the retention wall 78 may extend from the second wall 106 and cover a portion of the end 72 to define the first opening portion 120 of the opening 80. The first opening portion 120 may be substantially curved or arcuate to provide a smooth surface for the seal 84 to slide against during installation into the slot 70. The first opening portion 120 may extend from the end 72 to the inner retention surface 102.

When two or more blades 30 are arranged adjacent to one another on a rotor disk 24, such as in the configuration shown in FIGS. 6-9 and discussed herein, the slot 70 of the pressure-side slash face 56 of each rotor blade 30 aligns with the slot 70 of the suction-side slash face 58 of a neighboring rotor blade 30 to define a channel 82. Rotor blades 30 arranged adjacent to one another may include rotor blades 30 directly neighboring one another on a rotor disk 24 and/or rotor blades 30 in direct contact with one another (e.g., blade 30' and blade 30"). The gap 60 may be partially disposed between the pressure-side slash face 56 and the suction-side slash face 58 of two neighboring blades 30 on a rotor disk 24. In some embodiments, the gap 60 may be partially disposed between the slot 70 of the pressure-side slash face 56 of each rotor blade 30 and the slot 70 of the suction-side slash face 58 of a neighboring rotor blade 30 on the rotor disk 24.

In many embodiments, the channel 82 may function to slidably receive and house the seal 84 therein. The seal 84 may extend from the slot 70 of the pressure-side slash face 56 to the slot 70 of the suction-side slash face 58 and cover the gap 60. In some embodiments, the seal 84 prevents unwanted hot gas from the turbine section 18 from leaking into the main body 35 of blade 30. Alternatively, or additionally, in many embodiments, the seal 84 may prevent compressed cooling air from the compressor section 14 from leaking out of the shank 38 and into the turbine section 18.

Figure 8:
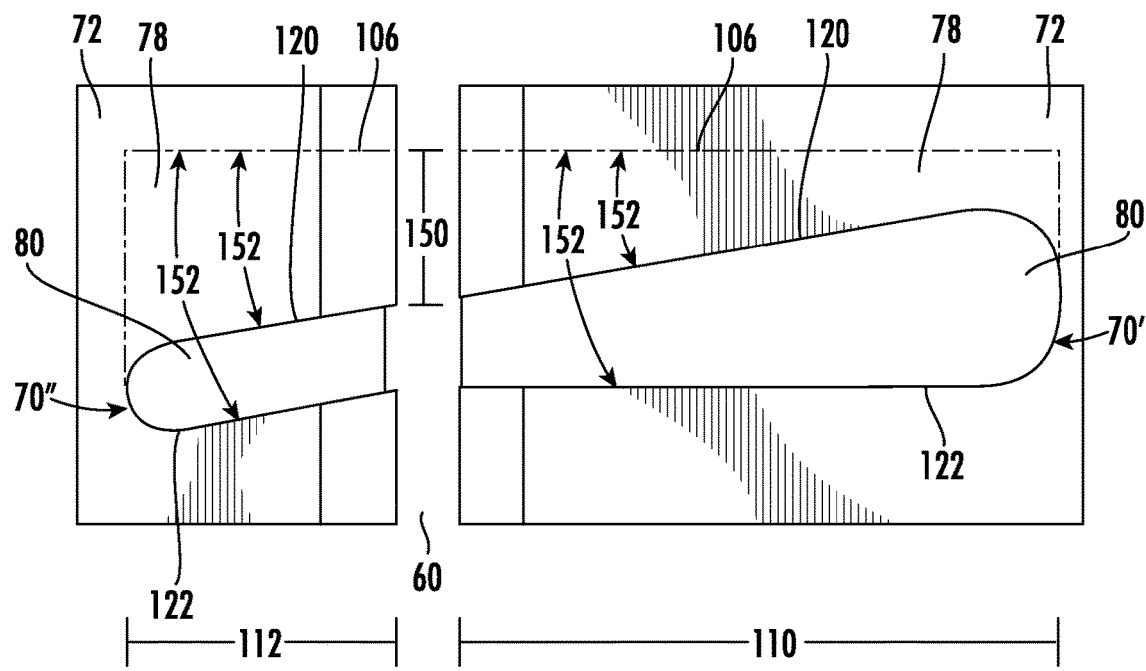
FIG. 8 illustrates the slot openings of two neighboring rotor blades, in accordance with embodiments of the present disclosure.
Figure 9:
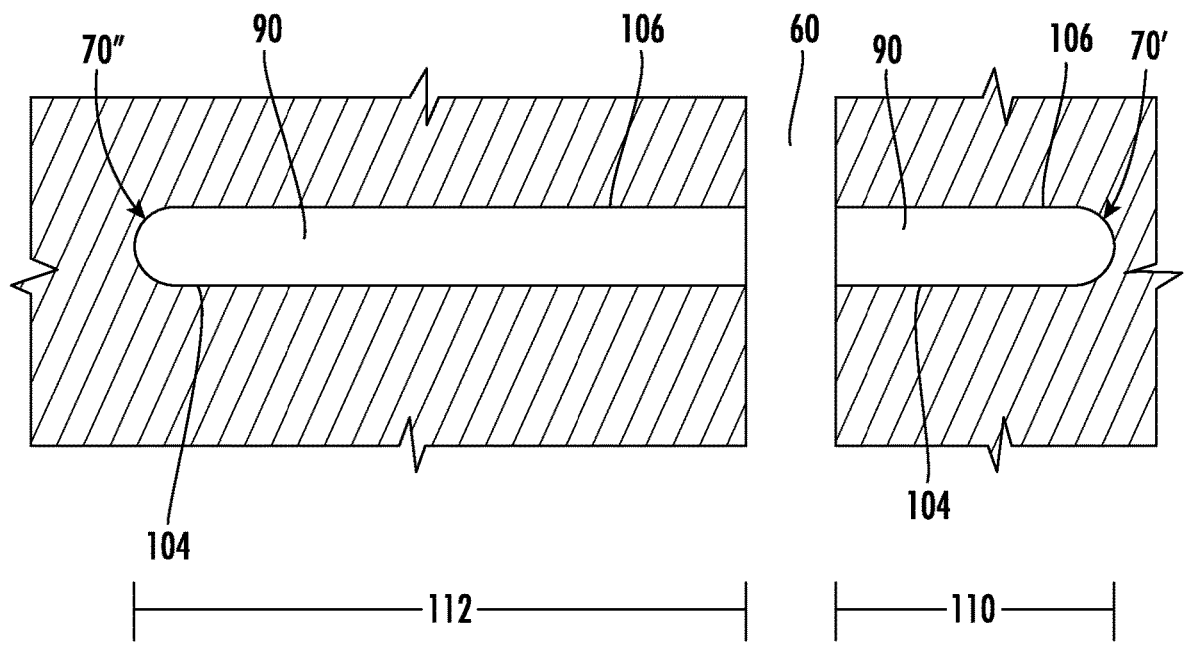
FIG. 9 is a cross-sectional view of slots along the main body of two neighboring rotor blades, in accordance with embodiments of the present disclosure.

As shown in FIGS. 7-9, the rotor blade assembly 200 includes a first slot 70' and a second slot 70" that are defined in neighboring rotor blades 30", 30', respectively. The first slot 70' of a rotor blade 30" may be aligned with the second slot 70" of a neighboring rotor blade 30', when positioned adjacent to one another on a rotor disk 28. The first slot 70' may be defined in either the pressure-side slash face 56 or the suction side slash face 58 of a rotor blade 30. Likewise, the second slot 70" may be defined in the corresponding suction-side slash face 58 or the pressure-side slash face 58 of a neighboring rotor blade 30. For example, if the first slot 70' is defined in the pressure-side slash face 56 of a rotor blade 30, then the second slot 70" may be defined in the suction-side slash face 58 of the neighboring rotor blade or vice versa.

Referring now to FIG. 7, a perspective view of circumferentially adjacent, neighboring rotor blades 30', 30" in the rotor blade assembly 200 is illustrated. As shown, the first slot 70' defined within the pressure-side slash face 56 of a rotor blade 30 faces the second slot 70" defined within the suction side slash face 58 of a neighboring rotor blade 30 when the rotor blades 30 are so positioned. In practice, when positioned as in FIG. 7, the opening 80 of the first slot 70' and the opening 80 of the second slot 70" function to slidably receive the seal 84 therein.

As shown in FIG. 4, the first end 86 of the seal 84 enters the openings 80 and is received through the main body portion 90 of the slots 70', 70" to the closed downstream ends 76. As the second end 88 of the seal 84 begins to pass through the opening 80, the pressure from the main body portion 90 on the first end 86 of the seal 84 forces the second end 88 to ride up the second slot wall 106 and rest against the inner retention surface 102 at the upstream end portion 74. Once installed, the first end 86 of the seal 84 may be in contact with the closed downstream end 76 of the first slot 70' and the second slot 70", and the second end 88 of the seal 84 may be in contact with the inner retention surface 102.

In some embodiments, the length of the seal 84 may be shorter than the total length of the slots 70', 70" to allow for thermal expansion of the seal 84. The seal 84 extends through the entire channel 82 and may occlude the gap 60 between the neighboring rotor blades 30', 30". Further, the inner retention surface 102 of the first slot 70' and the second slot 70" prevents the seal 84 from backing out of the slots 70', 70".

FIG. 8 illustrates the openings 80 of the first slot 70' and second slot 70" of neighboring rotor blades 30', 30". As shown in FIG. 8, retention wall 78 may define a translational offset 150 from the slot opening 80. More specifically, the retention wall 78 may define a translational offset 150 between the first opening portion 120 and the second wall 106 of the slot 70.

In some embodiments, the translational offset 150 may be up to about 1.5 inches. In other embodiments the translational offset 150 may be up to about 1.0 inches. In many embodiments, the translational offset 150 may be up to about 0.75 inches. In other embodiments, the translational offset 150 may be up to about 0.5 inches. In various embodiments, the translational offset 150 may be up to about 0.4 inches. In many embodiments, the translational offset 150 may be up to about 0.3 inches. In some embodiments, the translational offset 150 may be up to about 0.2 inches. In other embodiments, the translational offset 150 may be up to about 0.1 inches.

In various embodiments, the translational offset 150 may be between about 0.75 inches and 1 inch. In many embodiments, the translational offset 150 may be between about 0.1 inches and 0.75 inches. In various embodiments, the translational offset 150 may be between about 0.1 inches and 0.5 inches. In other embodiments, the translational offset 150 may be between about 0.1 inches and 0.4 inches. In many embodiments, the translational offset 150 may be between about 0.1 inches and 0.3 inches. In other embodiments, the translational offset 150 may be between about 0.1 and 0.2 inches.

Alternatively, or additionally to the translational offset 150, the retention wall 78 may also include a rotational offset 152. Specifically, the first opening portion 120 may include both a translational offset 150 and a rotational offset 152 from the second slot wall 106. The rotational offset 152 may be defined angularly with respect to the second slot wall 106. In some embodiments, the translational offset 150 of the first slot 70' may change along a first slot depth 110 due to the translational offset 152. Likewise, the translational offset 150 of the second slot 70" may change along a second slot depth 112 due to the rotational offset 152.

In some embodiments, the second opening portion 122 may also include a rotational offset 152 from the second slot wall 106. In various embodiments, the rotational offset 152 of the first opening portion 120 of a slot 70 may be different from the rotational offset 152 of the second opening portion 122 of the same slot 70. As shown in FIG. 8, the first slot 70' and the second slot 70" may each include a different translational offset 150 and rotational offset 152. For example, the first slot 70' may have a first opening portion 120 and a second opening portion 122 with the same rotational offset 152, i.e., they are substantially parallel, while the second slot 70" may have a first opening portion 120 and a second opening portion 122 that each have a different rotational offset 152.

In many embodiments, such as the one shown in FIG. 8, the first opening portion 120 of the first slot 70' and the first opening portion 120 of the second slot 70" may have the same rotational offset 152. Further, the second opening portion 122 of the first slot 70' and the second opening portion 122 of the second slot 70" may each have a different rotational offset 152.

In some embodiments, the rotational offset 152 may be up to about 60 degrees. In other embodiments, the rotational offset 152 may be up to about 50 degrees. In many embodiments, the rotational offset 152 may be up to about 40 degrees. In some embodiments, the rotational offset 152 may be up to about 30 degrees. In various embodiments, the rotational offset 152 may be up to about 20 degrees. In many embodiments, the rotational offset 152 may be up to about 10 degrees. In other embodiments, the rotational offset 152 may be up to about 5 degrees.

In other embodiments, the rotational offset 152 may be between about 5 degrees and about 60 degrees. In various embodiments, the rotational offset 152 may be between about 5 degrees and about 50 degrees. In many embodiments, the rotational offset 152 may be between about 5 degrees and about 40 degrees. In various embodiments, the rotational offset 152 may be between about 5 degrees and about 30 degrees. In other embodiments, the rotational offset 152 may be between about 5 degrees and about 20 degrees. In many embodiments, the rotational offset 152 may be between about 5 degrees and about 10 degrees. In many embodiments, the rotational offset 152 may be between about zero and about 5 degrees.

As seen in FIG. 8, the first slot 70' may include the first slot depth 110, and the second slot 70" may include the second slot depth 112. Both the first slot depth 110 and the second slot depth 112 may change from the end 72 to the closed downstream end 76. For example, the first slot depth 110 or the second slot depth 112 may change, i.e., become larger or smaller, from the end 72 to the leading edge segment 92 of the main body portion 90 of slot 70. In general, the summation of the first slot depth 110, the second slot depth 112, and the length of gap 60 is generally equal to the width of seal 84 along the entire length of channel 82.

In various embodiments, the seal 84 may be slightly smaller than the slots 70',70" and may have room for thermal expansion within the slots 70',70". Additionally, the seal 84 may be sized to allow for manufacturing variations thereof. For example, in many embodiments, the width of seal 84 may be between about 70% and about 100% the width of the channel 82 to allow for both manufacturing variations and thermal expansion within the slots 70. In the embodiment shown in FIG. 8, the first slot depth 110 is larger and/or different than the second slot depth 112 at the opening 80; however, the first and second slot depths 110 and 112 may be generally equal at the opening 80 in other embodiments.

Referring now to FIG. 9, illustrating a cross section enlarged view of the first slot 70' and second slot 70" along the main body portion 90 of the slots 70', 70". For example, FIG. 9 may be along the platform segment 94 of the main body portion 90 of slots 70', 70". Alternatively, FIG. 9 may show a cross section of slots 70', 70" along the trailing edge segment 96. As shown in FIG. 9, the first depth 110 may be shorter than the second slot depth 112 along the main body portion 90 of slots 70',70".

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A rotor blade assembly for a turbomachine, the rotor blade assembly comprising:
    a rotor disk;
        a first rotor blade and a second rotor blade mounted on the rotor disk adjacent to one another, the first rotor blade and second rotor blade each comprising:
        a main body having a shank, an airfoil extending radially outwardly from the shank, and a platform, the main body comprising a pressure side slash face and a suction side slash face;
        a slot defined within each of the pressure side slash face and the suction side slash face, wherein the slot of the pressure side slash face and the slot of the suction side slash face each comprise:
        a first slot wall;
        a second slot wall opposite the first slot wall;
        an upstream end portion having an end that defines an axially extending surface;
        an opening defined at least partially by the first slot wall on the axially extending surface;
        a main body portion extending from the upstream end portion, the upstream end portion tapering from the end to the main body portion, the upstream end portion comprising a retention wall extending from the second slot wall to a boundary that partially defines the opening at the end, the retention wall comprising an inner retention surface, the boundary of the retention wall defining a rotational offset and a translational offset with respect to the second slot wall, wherein the rotational offset is defined between the second slot wall and the boundary in a plane of the axially extending surface; and
        wherein the slot of the pressure side slash face of the first rotor blade and the slot of the suction side slash face of the second rotor blade define a channel.

2. The rotor blade assembly of claim 1, wherein the main body portion extends between the upstream end portion and a closed downstream end.

3. The rotor blade assembly of claim 1, wherein the translational offset is up to about 1.5 inches.

4. The rotor blade assembly of claim 1, wherein the rotational offset is between about 5 degrees and about 60 degrees.

5. The rotor blade assembly of claim 2, further comprising a seal positioned within the channel, wherein the seal is held in place at least partially by the retention wall.

6. The rotor blade assembly of claim 2, wherein the slot is continuous from the opening to the closed downstream end.

7. The rotor blade assembly of claim 2, wherein the slot of the pressure side slash face and the slot of the suction side slash face each include a depth defined circumferentially into the respective slash face; and wherein the depth of each respective slot changes from the upstream end portion to the closed downstream end.

8. A rotor blade for a turbomachine, the rotor blade comprising:
a main body having a shank, an airfoil extending radially outwardly from the shank, and a platform, the main body comprising a pressure side slash face and a suction side slash face;
a slot defined within each of the pressure side slash face and the suction side slash face, wherein the slot of the pressure side slash face and the slot of the suction side slash face each comprise:
a first slot wall;
a second slot wall opposite the first slot wall;
an upstream end portion having an end that defines an axially extending surface;
an opening defined at least partially by the first slot wall on the axially extending surface;
a main body portion extending from the upstream end portion, the upstream end portion tapering from the end to the main body portion, the upstream end portion comprising a retention wall extending from the second slot wall to a boundary that partially defines the opening, the retention wall comprising an inner retention surface, the boundary of the retention wall defining a rotational offset and a translational offset with respect to the second slot wall.

9. The rotor blade of claim 8, wherein the rotor blade is a first rotor blade; and wherein the slot of the pressure side slash face of the first rotor blade and the slot of the suction side slash face of a second rotor blade define a channel when mounted adjacent to one another on a rotor disk.

10. The rotor blade of claim 8, wherein the main body portion extends between the upstream end portion and a closed downstream end.

11. The rotor blade of claim 8, wherein the translational offset is up to about 1.5 inches.

12. The rotor blade of claim 8, wherein the rotational offset is between about 5 degrees and about 60 degrees.

13. The rotor blade of claim 10, further comprising a seal at least partially positioned within the main body portion, wherein the seal is held in place at least partially by the retention wall.

14. The rotor blade of claim 10, wherein the slot is continuous from the opening to the closed downstream end.

15. The rotor blade of claim 10, wherein the slot of the pressure side slash face and the slot the suction side slash face each include a depth defined circumferentially into the respective slash face; and wherein the depth of each respective slot changes from the upstream end portion to the closed downstream end.

16. A turbomachine, comprising:
a compressor section;
a combustor section;
a turbine section;
a plurality of rotor blades provided in at least one of the compressor section or the turbine section, each of the plurality of rotor blades comprising:
a main body having a shank, an airfoil extending radially outwardly from the shank, and
a platform, the main body comprising a pressure side slash face and a suction side slash face;
a slot defined within each of the pressure side slash face and the suction side slash face, wherein the slot of the pressure side slash face and the slot of the suction side slash face each comprise:
a first slot wall;
a second slot wall opposite the first slot wall;
an upstream end portion having an end that defines an axially extending surface;
an opening defined at least partially by the first slot wall on the axially extending surface;
a main body portion extending from the upstream end portion, the upstream end portion tapering from the end to the main body portion, the upstream end portion comprising a retention wall extending from the second slot wall to a boundary that partially defines the opening at the end, the retention wall comprising an inner retention surface, the boundary of the retention wall defining a rotational offset and a translational offset with respect to the second slot wall.

17. The rotor blade of claim 1, wherein the slot includes a leading edge segment oriented generally radially and defined along a leading edge portion of the shank, a platform segment oriented generally axially and defined along the platform, and a trailing edge segment oriented generally radially and defined along a trailing edge portion of the shank.

18. The rotor blade of claim 1, wherein the boundary is a first, and wherein the first slot wall a second boundary that partially defines the opening, such that the opening is defined collectively by the first boundary and the second boundary, wherein the shank defines an axially extending surface, and wherein the opening is defined on the axially extending surface by the first opening portion and the second opening portion such that the opening faces a radial direction.

* * * * *